United States Patent [19]

Kim et al.

[11] Patent Number: 5,080,846
[45] Date of Patent: Jan. 14, 1992

[54] PROCESS FOR REMOVING POLYACETAL BINDER FROM MOLDED CERAMIC GREENBODIES

[75] Inventors: Hongkyu Kim, Basking Ridge; Gerd Wingefeld, Bridgewater, both of N.J.

[73] Assignee: Hoechst Celanese Corp., Somerville, N.J.

[21] Appl. No.: 436,289

[22] Filed: Nov. 13, 1989

[51] Int. Cl.⁵ .............................................. C04B 33/02
[52] U.S. Cl. ...................................... 264/109; 264/63; 264/211.11; 264/328.2; 264/344; 419/36; 419/38; 419/41; 419/44; 419/65
[58] Field of Search ...................... 264/63, 344, 211.11, 264/328.2, 109; 419/36, 38, 41, 44, 65

[56] References Cited

U.S. PATENT DOCUMENTS

| | | | |
|---|---|---|---|
| 4,624,812 | 11/1986 | Farrow et al. | 264/63 |
| 4,664,883 | 5/1987 | Melody et al. | 419/2 |
| 4,784,812 | 11/1988 | Saitoh et al. | 264/63 |
| 4,795,598 | 1/1989 | Billiet | 264/40.6 |

*Primary Examiner*—James Derrington
*Attorney, Agent, or Firm*—Depaoli & O'Brien

[57] ABSTRACT

A polyacetal binder is removed from an extruded or injection molded ceramic green body in less than 25 hours by a variable heating rate schedule in which the heating rate is reduced when the temperature of the green body reaches the point at which isothermal degradation of the polyacetal binder can take place and wherein at least 80 wt. % of the binder can be removed. In air, the isothermal removal of the binder can take place within the range of 160°-220° C. while in nitrogen the range is from about 300°-360° C.

21 Claims, No Drawings

PROCESS FOR REMOVING POLYACETAL BINDER FROM MOLDED CERAMIC GREENBODIES

BACKGROUND OF THE INVENTION

The present invention relates to an improved process for making ceramic articles from extrusion or injection moldable ceramic compositions. More particularly, the present invention is directed to a process for binder removal from a molded ceramic green body containing ceramic powder and a polyacetal binder.

Ceramic materials are of critical importance for a number of high temperature, high performance applications. Recently, there has been substantial interest in the development of ceramic compositions for critical engine parts including reciprocating engines, gas turbine and rocket engines. These applications require a unique combination of properties such as high specific strength, high temperature mechanical property retention, low thermal and electrical conductivity, hardness and wear resistance, and chemical inertness. However, the inability to produce complex shapes of high dimensional accuracy and sufficient strength using an economical fabrication technique has prevented ceramic materials from fulfilling their potential in these critical high temperature, high performance applications.

Several processes have been used in an attempt to form ceramic bodies. Among such processes include pressing ceramic powder into a greenbody followed by sintering or by hot pressing and subsequently shaping or machining the sintered body to produce the finished product. Another technique is slip casting in which the ceramic particles are dispersed in water, the slurry placed in a mold and the water removed to form a greenbody. The pressing techniques have been found unsuitable to form ceramic articles of complex shapes and which must meet specific design specifications. The slip casting technique is time consuming and has not yielded greenbodies of sufficient strength.

In view of the problems associated with the prior techniques, injection molding has been increasingly used to form ceramic articles. Injection molding is a process wherein a moldable composition is forced into a mold or die. The injection molding process facilitates a rapid and repeated forming of a plurality of articles having a consistency with close dimensional tolerance. The injection molding process also minimizes the amount of shaping or machining that may be required to produce a finished article.

The injection molding process typically involves forming a ceramic greenbody by injection molding a composition comprising ceramic powder dispersed within a thermoplastic polymer, burning out the polymer, and sintering the resulting porous greenbody to a dense ceramic part with the same shape. The thermoplastic binder acts as a fluidizing agent to distribute the injection pressure throughout the mold and as the material which holds the ceramic particles in the shape of the mold after the part is ejected. A typical ceramic powder/thermoplastic polymer composite has a very high content of the ceramic particles, typically from about 50 to about 87 volume % and a minimum of the binder material to hold the particles together in desired shape. A useful binder material for ceramic injection molding is a polyacetal resin as disclosed in U.S. Pat. No. 4,624,812, the entire contents of which are herein incorporated by reference.

A typical injection moldable ceramic composition will also contain a minor binder component which is often a thermoplastic, wax or oil, plasticizers which increase the fluidity of the ceramic-binder mixture, and processing aids such as surfactants which improve the wetting characteristics between the plastic binder and ceramic during mixing to form the composite.

A summary of injection molding applied to the fabrication of molded ceramic bodies is provided in an article entitled "Review: Fabrication of Engineering Ceramics by Injection Molding. I. Materials Selection", M. J. Edirisinghe et al, *International Journal of High Technology Ceramics*, Vol. II, 1986, pp. 1–31.

A major problem with regard to the formation of ceramic articles by injection molding, relates to the difficulty of removing the binder such as by a thermal degradation process. Often, during binder burn-out, the generation of internal pressures from gaseous decomposition products disrupts the integrity of the green body such as in the formation of cracks, blisters and other surface deformities. To reduce the effects of the escaping gaseous decomposition products from the binder, it is often necessary to utilize an extremely flat temperature profile during the burn-out stage. Unfortunately, a slow rise in temperature to achieve binder burn-out results in an excessively long time, i.e., greater than 10 days and even greater than 20 days, before the binder is removed, thereby greatly reducing the commercial viability of the injection molding process to form ceramic articles.

Also, the rate of extraction of the binder depends on the thickness of the greenbody in an inverse relationship, i.e., the thicker the cross section of the greenbody, the longer it takes to extract the binder. In general, the rate of binder extraction is limited as a result of the generation of gaseous decomposition products which tend to disrupt the integrity of the greenbody and reduced extraction efficiency as degradation products build up within the greenbody. The result is often the introduction of practical constraints for part wall thickness in order to keep the process economical as well as the use of very flat temperature profiles which as discussed previously greatly lengthens the burn-out process and, thus, reduces the economic viability of the injection molding process for producing ceramic articles.

While the use of polyacetal binding agents as disclosed in the aforementioned U.S. Pat. 4,624,812 is advantageous since the polyacetal depolymerizes relatively easily during the burn-out process, sharp temperature profiles tend to cause disruptions on the article's surface in the form of cracks and blisters. The use of a flat temperature profile, on the other hand, results in excessive time to completely remove the binder. Such time can be in excess of 50 hours.

It is therefore an object of this invention to provide an improved process for forming ceramic articles by the injection molding process. A further object of this invention is to provide an improved process for removing the organic binder from a molded ceramic greenbody in which a polyacetal resin is used as the binder. It is still a further object of this invention to provide an improved process for removing a polyacetal binder from a molded ceramic greenbody without disrupting the surface of the formed ceramic article and which binder removal process can be achieved in a substantially shorter time than previously contemplated.

SUMMARY OF THE INVENTION

It has now been found that in the process for injection molding a ceramic composition comprising sinterable powders and a polyacetal binder, the polyacetal binder can be removed by thermal degradation in less than 25 hours without disrupting the integrity of the ceramic article which is formed. Thus, it has been discovered that a major portion, approximately 80-90%, of the polyacetal binder in the molded ceramic greenbody can be isothermally removed at a temperature within the range of 160°-220° C. in air and 300°-360° C. in an inert atmosphere such as nitrogen. The residual portion of the binder can be removed in air at temperatures of from about 350°-450° C. and at about 400°-500° C. in an inert atmosphere.

In accordance with the present invention, the polyacetal binder is removed utilizing a burn-out schedule which includes a heat-up period to the isothermal temperature at which the major portion of the binder can be removed, a heating stage to remove the majority of the binder, and a third heat-up period to remove the residual portion of the binder. To avoid surface disruption of the ceramic article during binder removal, any increase in temperature in the range at which isothermal degradation of the binder can occur, e.g., between about 160° C. and 220° C. in air, and prior to substantial binder removal, is accomplished at a very flat temperature profile corresponding to about 2°-10° C. per hour. It has also been found that at temperatures of from about 130°-175° C. in air, a small portion of the binder is removed and that the temperature profile within this temperature range should be carefully controlled to avoid surface disruptions of the ceramic article.

DESCRIPTION OF THE PREFERRED EMBODIMENTS

The ceramic powder employed in the moldable compositions of the present invention is selected according to the designed function of the molded article as is known to those with skill in the art. Typical ceramic powders include aluminum oxide ($Al_2O_3$); zirconium oxide (preferably calcium oxide-stabilized $ZrO_2$), silicon dioxide (preferably fused $SiO_2$), silicon nitride ($Si_3N_4$), silicon carbide (SiC), silicon, ferrite and mixtures thereof. In its broadest aspect, the present invention is directed to any sinterable composition which can be injection molded. Thus, metal and metal alloy powders may be used in accordance with the process of this invention.

To obtain a sintered molded article which exhibits excellent characteristics, the ceramic powder should be selected and/or treated such that close packing of powder particles may be obtained. In particular, important factors for particle packing are particle size distribution and the degree of agglomeration. To obtain optimum packing, a broad distribution of particle sizes is desirable as is well known to those having ordinary skill in the art.

The degree of agglomeration is a function of the size of the individual particles. The smaller the particle size, the greater the surface attraction and strength of electrostatic forces which leads to a higher degree of agglomeration. While the specific particle size employed will depend on the chemical compound selected for the ceramic powder and the function of the molded article, the average particle size will typically be in the range of from about 0.1 to about 30 microns, preferably from about 0.5 to about 10 microns. The shape of the individual particles also effects agglomeration with spheres yielding the greatest density, cylindrical rods with slightly lowered density and dagger-shaped fibers with yet lower density.

In the interest of completeness, it should be pointed out here that powder packing is also affected by the particle array. However, since this is principally a random occurrence in the context of the present invention, a further discussion of this factor is not believed to be warranted.

In the event that the particles of the available ceramic powder are too large or are of a shape which yields a low packing density, treatment of the powder may lead to improved results. Such treatment may be accomplished through either wet or dry ball milling, jet milling with the particles propelled by gas to promote impact thereof, or other types of milling techniques whereby the particle size is reduced and the particle shape altered. Thus, for example, aluminum oxide available from Alcoa (A16SG) may be ball milled with 0.5% oleic acid to reduce the degree of agglomeration. Similarly, milling of needle-shaped particles of silicon nitride will improve the packing density. However, in this instance, care should be taken such that the degree of agglomeration of the milled silicon nitride is not increased to an extent whereby the overall improvement is negligible.

The ceramic composition of the present invention also includes a binding agent in an amount ranging from about 10 to 50%, preferably from about 15 to about 35% by weight of the total mixture which serves to maintain the integrity of the shaped article prior to sintering. The binding agent is a polyacetal having the recurring unit $-OCH_2-$. Preferably, the polyacetal binding agent will contain at least 50 mole % of such oxymethylene recurring units. The term "polyacetal" and the recurring unit should be understood to encompass both homopolymers and copolymers which will be discussed in detail below.

The polyacetals employed in the present invention are per se known in the art. For example, polyacetals commercially available under the registered trademark Celcon may be prepared by polymerizing trioxane in accordance with teachings of U.S. Pat. No. 3,027,352, the contents of which are hereby incorporated by reference.

The polyacetals binding agents of the present invention yield numerous advantages. In particular, the polyacetals readily depolymerize to small molecules of formaldehyde through an unzipping of the polymer chain. Heating causes a substantially uniform evolution of volatiles. The volatile material is a clean burning fuel that does not leave any undesirable or difficultly removable residue. The ready depolymerization of the polyactal allows for quicker removal of the binding agent from the ceramic green body than is the case of, for example, a polypropylene binder. However, flat temperature profiles can extend the time of burn-out and may also cause disruptions of the surface of the ceramic article if not carefully chosen as in the present invention to take into consideration the temperature at which the greatest amount of polyacetal binder is thermally degraded.

A yet further significant advantage of the use of polyacetals as the binding agent is that by selecting certain comonomers, copolymer binding agents may be tailored to the specific ceramic powder employed. More specifically, trioxane can be polymerized with ethylene oxide, dioxolane, substituted dioxolanes, trioxepane and 1,4-dioxane in amounts ranging from about 2 to about 80 mole % of the total comonomers present. Such copolymers can provide a lower melting point, lower crystallinity and increased softness and flexibility. For instance, by copolymerizing dioxolane with trioxane in substantially equimolar proportions, a copolymer binding agent which is particularly suitable for aluminum oxide ceramic powder may be obtained.

The binding agent may also be comprised of small amounts of from about 1.0 to about 10% by weight of known materials which serve an additional binding function. Such materials include low density polyethylene, atactic polypropylene, ethylene vinyl acetate and waxes such as stearic acid and paraffin wax.

In addition to the ceramic powder and the binding agent, the ceramic composition of the present invention may further contain conventional amounts of wetting agents, plasticizers and other types of processing aids which are added to the composition to obtain a suitable rheological system for molding. Specifically, from about 0.1 to about 5.0% by weight of wetting agents or surfactants can promote adhesion between the ceramic powder and the binding agent thereby reducing the degree of agglomeration. Suitable wetting agents or surfactants include lignite, mineral oil and low molecular weight waxes. Plasticizers in an amount of from about 1.0 to about 10% by weight decrease the viscosity of the composite to promote mixing. Typical plasticizers include waxes, silicones, alkyl phthalates, polyalkylene (e.g., polyethylene) glycols and linear saturated polyesters. Mold release agents in an amount of from about 0.05 to about 2.0% by weight prevent adhesion to the mold wall thereby facilitating removal of the shaped article from the mold. Typical mold release agents include silicones and various phthalates and amides such as Acrawax C ® and Hoechst Microwax C ® (a fatty acid amide).

To mold the ceramic composition into shaped articles, the selected ceramic or metal powder is initially dispersed or mixed in the binding agent. Also present at this time are any additives which are to be included in the composition. Mixing of the ceramic powder, the binding and any additives is performed in the absence of oxygen to preclude oxidation of the ceramic powder. This may be achieved by conducting the mixing operation in a vacuum or under an inert atmosphere such as nitrogen or argon.

To obtain a homogenous mixture, the components of the composition are first mixed with low shear at a temperature of from about room temperature to about 200° C. for from about 5 minutes to about 60 minutes. The composition is then sheared in this temperature range for from about 5 to about 30 minutes. If the mixture has been heated, it is thereafter cooled, while mixing under shear is continued. For example, the temperature is reduced from about 200° to about 170° C. The resulting mixture should have a viscosity of less than about 1,000 poise at a shear rate of 1,000 sec$^{-1}$ as measured by a capillary rheometer at a temperature in the range of from about 100° to about 300° C.

The mixture is next extruded at a die temperature in the range of from about 190° to about 220° C. and a pressure in the range of from about 500 to about 2000 psig. Extrusion can be achieved by various pieces of equipment known to those of ordinary skill in the art. For example, the equipment may be a twin-screw extruder operating at a die temperature of about 70° C.

Alternatively, a mixture-extruder may be employed which intimately mixes the components of the composition in a substantial absence of air and then extrudes the mixture.

Subsequent to the extrusion step, the extrudate is chipped or chopped to obtain pieces of the composition which are in the range of from about 1/16 to about ¼ inch in maximum dimension. While extrusion and chipping may be eliminated and the composition directly injection molded, it is preferably extruded and then chipped or chopped into pieces which may be readily fed into a hopper feeder of conventional injection molding machine. The chipped composition is then heated to a temperature from about 175° to about 200° C., and injected at a pressure in the range from about 500 to about 1000 psig. into a cold mold (i.e., from about room temperature to about 150° C.) where the composition hardens. Pressure is maintained on the composition until hardening is achieved. Typically, this requires from about 20 to about 60 seconds.

To remove the polyacetal binding agent and any other volatile additives which may be included in the ceramic composition, the ceramic green body is gradually heated. The heating can take place in air or in an inert atmosphere such as nitrogen. What has been discovered is that the polyacetal binding agent begins to decompose very rapidly upon reaching a critical temperature. Moreover, the decomposition of the polyacetal binder depends not only on the temperature, but also the time at a certain temperature. Thus, it has been found that the higher the temperature, a shorter induction time is required to start the decomposition of the polyacetal. What has been discovered is that at a temperature between about 160°-220° C. in air, the decomposition of the polyacetal binder is very rapid and that most of the binder can be removed isothermally at a temperature within this range. This critical temperature is reached between about 300°-360° C. in an inert atmosphere. By heating isothermally or by increasing the temperature by utilizing a low heating rate between about 160°-220° C., a constant weight loss rate is achieved in this temperature regime without creating any defects in the resulting ceramic article. Increasing the temperature from 160° C. by use of a low heating rate eliminates the difficulty in selecting the right temperature at which the decomposition of the polyacetal begins.

It has been found, contrary to that suggested in aforementioned U.S. Pat. No. 4,624,812, that using a constant heating rate to increase temperature does not practically allow for the production of ceramic articles which are free from cracks or other surface defects. Thus, increasing the temperature at a low constant heating rate from room temperature, such as around 5° C. per hour, extends the time for removing the polyacetal binder to well over 50 hours. On the other hand, increasing the temperature at a constant heating rate of 10° C. or 20° C. per hour yields ceramic articles which are cracked and, thus, not suitable for commercial use.

In accordance with the present invention, a minimum of three heating rates are used to burn out the polyacetal binder and produce defect-free articles in less than about 25 hours. In this invention, a first heating rate is used to increase the temperature of the ceramic green body from about room temperature to the minimum temperature at which isothermal degradation of the polyacetal can be achieved, i.e., 160° C. in air and 300° C. in an inert gas. A relatively fast heating rate is used in this first stage comprising up to about 60° C. per hour. At the critical temperature of from between 160°–220° C. in air and 300°–360° C. in an inert gas such as nitrogen, the heating rate should not exceed 10° C. per hour. It is to be understood that within this critical temperature range, the polyacetal binder can be isothermally removed by holding the temperature constant for up to 15 hours. Upon removal of at least 80 wt. % of the binder, the heating rate can then be increased. Subsequent to the second stage heating in which at least 80 wt. % of the binder is removed, the heating rate can be increased to complete the removal of the polyacetal binder and any other volatile components which are present in the green body. In air, substantially complete volatile removal can be achieved at 400° C. In nitrogen, slightly higher temperatures are needed, up to 500° C., to remove the organic components.

Preferably, to remove the polyacetal binder, four different heating rates are utilized. Thus, it has been discovered that at temperatures between about 130°–175° C., a small amount, approximately 2 wt. % of the polyacetal binder in the ceramic green body is removed. Thus, within the temperature range of from about 130°–175° C., the heating rate should be lowered relative to the rate used to heat the ceramic green body from room temperature to 130° C. Accordingly, a preferred heating rate schedule in air is as follows. From room temperature to 130° C., a heating rate of from about 15°–60° C. per hour, preferably 20°–45° C. per hour and, most preferably, 30° C. per hour is used. From 130°–175° C., preferably from 130°–160° C., a heating rate of from about 10°–30° C. per hour is used and, more preferably, from 10°–15° C. per hour. From 160°–220° C., a heating rate of from 2°–10° C. per hour and, more preferably, no greater than about 5° C. per hour is utilized. Again, it is to be understood that within 160°–220° C., isothermal removal of the polyacetal binder takes place and that by holding the temperature at any point within this range for up to 15 hours, and even as little as 10 hours, removal of at least 80 wt. %, even as much as up to about 90 wt. % of the binder can be achieved and that the heating rate can be increased subsequent to such removal. From 220°–450° C., a heating rate of up to 60° C. per hour may be used. It is to be understood that the temperature rate described above is for heating in air and that for heating in an inert atmosphere such as nitrogen, higher temperatures must be utilized. The overlapping of temperatures found within the heating stages can be attributed to variations in the polyacetal binder used. Thus, heating from 130°–175° C. in air may not result in defects in the ceramic article even though the critical minimum temperature for isothermal degradation, e.g., 160° C., is passed at a heating rate higher than 10° C.

The burn-out rate schedule is controlled to achieve substantially complete removal of organic components from the ceramic green body in a time which should not exceed about 25 hours. Defect free parts can be consistently formed utilizing the heating rate schedule as above described in less than 25 hours substantially improving the economy of injection molding ceramic components.

Subsequent to binder removal, the temperature is then raised to that required for sintering the ceramic powder. While the rate of final temperature will naturally depend upon the characteristics of the ceramic powder and the shaped article, a rate of temperature increase will generally be in the range of from about 50 to about 1000 degrees per hour until a temperature in the range of from about 1000° to about 1800° C. is obtained. To fully sinter the ceramic powder, the shaped article is held at final temperature for about 15 minutes to about 8 hours. Sintering is generally undertaken in an atmosphere composed of air or an inert gas.

By the present invention, various sintered articles may be prepared. Such articles include electrical insulators, furnace elements, crucibles, heat exchange tubes, molds and cores for metal casting and other applications known to those of ordinary skill in the art.

To obtain a more complete understanding of the present invention, the following examples of preparing molded ceramic articles are set forth. It should be understood, however, that the invention is not limited to the specific details set forth therein.

EXAMPLES

Identical test bars were formed by injection molding a solvent-free composition comprising 65 vol% silicon powder in a polyacetal binder. The composition was as follows:

|  | wt. % of total | vol % of total |
|---|---|---|
| Polyacetal[1] | 16.6 | 23.0 |
| Si powder, 7 micron | 77.3 | 65.0 |
| Other components | 6.1 | 12.0 |

[1]Celcon M450 a polyacetal-copolymer, Hoechst Celanese

The composition was mixed in a Brabender mixing head with a set of volle blades and cut into granules 1/16–¼" in size. The composition was molded into test bars by heating the granules at a temperature of 190° C. and injecting same into a mold at a pressure of about 1,000 psig. The mold was at 135° C.

The test samples were then heated using various temperature-time schedules to remove the polyacetal binder. The particular temperature-time schedule utilized and the results which were observed in the test samples subsequent to binder removal are set forth in Table 1.

TABLE 1

| Ex. No. | Temperature/Time-Rate | | | Time | Results |
|---|---|---|---|---|---|
| 1 | RT | 130° C. | 60° C./h | 1.8 h | small cracks |
|  | 130 | 165° C. | 30° C./h | 1.2 h |  |
|  | 165 | 220° C. | 5° C./h | 11.0 h |  |
|  |  |  | Total | 14.0 h |  |
| 2. | RT | 130° C. | 30° C./h | 3.5 h | no cracks |
|  | 130 | 165° C. | 12° C./h | 2.9 h |  |
|  | 165 | 220° C. | 5° C./h | 11.0 h |  |
|  |  |  | Total | 17.4 h |  |
| 3. | RT | 130° C. | 30° C./h | 3.5 h | no cracks |
|  | 130 | 165° C. | 12° C./h | 2.9 h |  |
|  | 165 | 220° C. | 5° C./h | 11.0 h |  |
|  | 220 | 400° C. | 30° C./h | 6.0 h |  |
|  |  |  | Total | 23.4 h |  |
| 4. | RT | 165° C. | 30° C./h | 4.7 h | cracks |
|  | 165 | 220° C. | 5° C./h | 11.0 h |  |
|  | 220 | 400° C. | 30° C./h | 6.0 h |  |
|  |  |  | Total | 21.7 h |  |
| 5. | RT | 130° C. | 60° C./h | 1.8 h | no cracks |
|  | 130 | 165° C. | 30° C./h | 1.2 h |  |
|  | 165° C. |  | 10 h | 10.0 h |  |
|  | 165 | 450° C. | 60° C./h | 4.8 h |  |
|  |  |  | Total | 17.8 h |  |
| 6. | RT | 130° C. | 60° C./h | 1.8 h | no cracks |
|  | 130 | 175° C. | 30° C./h | 1.5 h |  |
|  | 175° C. |  | 10 h | 10.0 h |  |

TABLE 1-continued

| Ex. No. | Temperature/Time-Rate | | | Time | Results |
|---|---|---|---|---|---|
| | 175 | 450° C. | 60° C./h | 4.6 h | |
| | | | Total | 17.9 h | |
| 7. | RT | 130° C. | 60° C./h | 1.8 h | cracks and |
| | 130 | 155° C. | 30° C./h | 0.8 h | blistering |
| | 155° C. | | 10 h | 10.0 h | |
| | 155 | 400° C. | 60° C./h | 4.1 h | |
| | | | Total | 16.7 h | |

As can be seen from Example 1, small cracks were observed in the molded test bar. This is believed to be attributable to the rise in temperature between 130°-165° C. at 30° C. per hour. While this is the maximum temperature found within the present invention, it can be seen that a smaller temperature rise within this second stage is more preferable. Cracks were also observed in Example 4. In this example, there was no reduction in the temperature increase between 130° C. and 165° C. and, like Example 1, it is believed that the 30° C. per hour heat increase within this range was too large for the particular polyacetal binder used. It can also been seen from Example 7 that isothermal degradation of the polyacetal resin does not take place at 155° C. Holding at this temperature for 10 hours and vastly increasing the heating rate to complete binder removal does not lead to defect-free parts in a total burn-out time of less than 25 hours. Accordingly, it is necessary to reach a temperature of at least 160° C. to provide for isothermal degradation. It can be seen that Examples 2, 3, 5 and 6 used a temperature-time schedule within the present invention and all achieved defect-free samples within 25 hours.

What is claimed is:

1. A process for preparing articles comprising: molding an essentially solvent-free composition containing a sinterable powder and a polyacetal binder having recurring —OCH$_2$— units to form a green body and removing said binder from the green body by heating said green body to the temperature at which isothermal degradation of said polyacetal binder takes place, said temperature comprising about 160°-220° C. in air or about 300°-360° C. in an inert gas. and increasing the temperature of said greenbody from said temperature at which isothermal degradation takes place at a rate not to exceed 10° C. per hour until about 220° C. in air or about 360° C. in an inert gas is reached and until at least 80 wt. % said binder is removed, and heating said green body subsequent to when said at least 80 wt. % of said binder is removed to remove substantially all of said binder within 25 hours.

2. The process of claim 1 comprising isothermally removing said at least 80 wt. % of said binder at a temperature within the range of 160°-220° C. in air or between about 300° C. and 360° C. in an inert atmosphere.

3. The process of claim 2 wherein said at least 80 wt. % of said binder is removed isothermally in air by holding the temperature between 160° C. to 220° C. for up to 15 hours.

4. The process of claim 3 wherein said at least 80 wt. % of said polyacetal binder is removed isothermally in air by maintaining the temperature between 160° C. to 220° C. for 10 hours.

5. The process of claim 2 wherein said at least 80 wt. % of said binder is removed isothermally in air by holding the temperature at 165° C. for 10 to 15 hours.

6. The process of claim 5 wherein said at least 80 wt. % of said polyacetal binder is removed by maintaining the temperature at 175° C. for 10-15 hours.

7. The process of claim 1 wherein the polyacetal binder is removed in air and said green body is heated to 160° C. and the temperature is increased from 160° C. to 220° C. at a heating rate of no more than 5° C. per hour to remove said at least 80 wt. % of said binder.

8. The process of claim 1 wherein said polyacetal binder comprises from 10 to 50 wt. % of said ceramic composition.

9. The process of claim 1 wherein said sinterable powder is a metal or metal alloy.

10. The process of claim 1 wherein said sinterable powder is a ceramic metal oxide, carbide or nitride.

11. The process of claim 1 comprising removing said polyacetal resin binder by heating the green body in air from room temperature to 130° C. at a first heating rate not exceeding 60° C. per hour and between 130° C. to 160°-175° C. at a second heating rate less than said first heating rate.

12. The process of claim 11 wherein said first heating rate between room temperature and 130° C. ranges from about 20° C. to 45° C. per hour.

13. The process of claim 11 wherein said second heating rate between 130° C. and 160°-175° C. is from about 10° C. to 30° C. per hour.

14. The process of claim 13 wherein said second heating rate between about 130° C. and 160°-175° C. is 10°-15° C. per hour.

15. The process of claim 13 comprising increasing the temperature of said green body from 160° C. to 220° C. at a third heating rate from about 2°-10° C. per hour.

16. The process of claim 15 wherein said third heating rate from 160°-220° C. is no greater than about 5° C. per hour.

17. The process of claim 1 wherein said polyacetal binder comprises at least 50 mol % oxymethylene units.

18. The process of claim 1 wherein said polyacetal binder comprises a copolymer comprising oxymethylene units and from about 2-80 mol % oxyalkylene units wherein said alkylene group contains 2-4 carbon atoms.

19. The process of claim 1 wherein said polyacetal binder is removed in an inert atmosphere.

20. The process of claim 1 wherein said molding is injection molding.

21. The process of claim 1 wherein said molding is extrusion molding.

* * * * *